Sept. 17, 1940.   M. KALISCHER   2,215,123
FOOD PRESERVING APPARATUS
Filed Nov. 5, 1938   3 Sheets-Sheet 1

INVENTOR
MILTON KALISCHER
BY
ATTORNEY

Sept. 17, 1940.　　　M. KALISCHER　　　2,215,123
FOOD PRESERVING APPARATUS
Filed Nov. 5, 1938　　　3 Sheets-Sheet 2
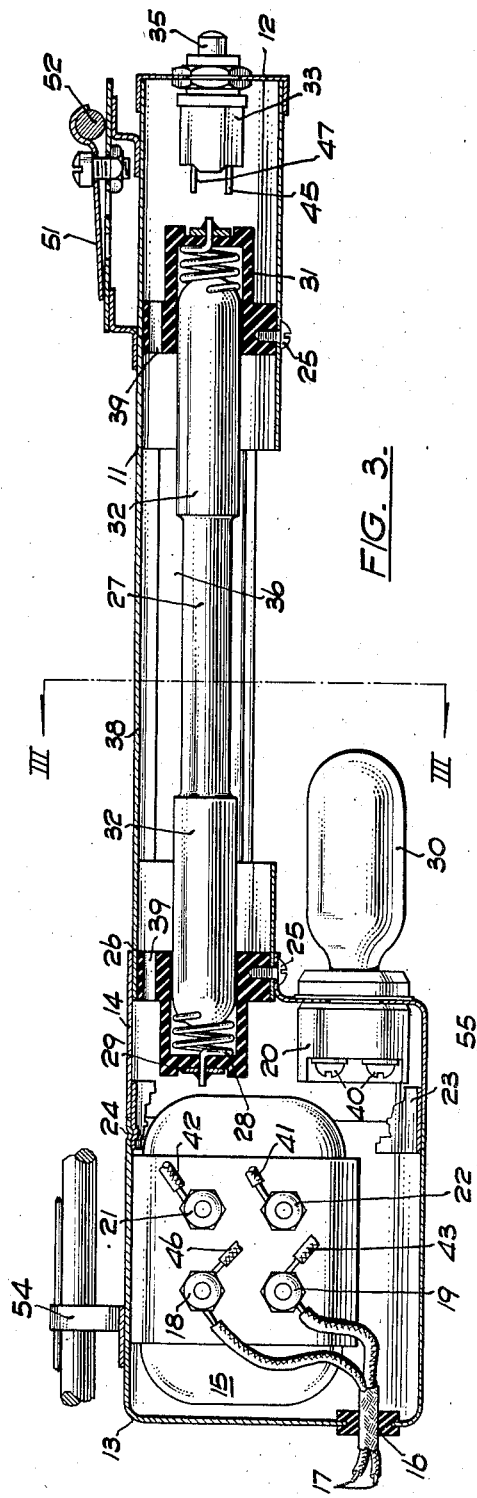
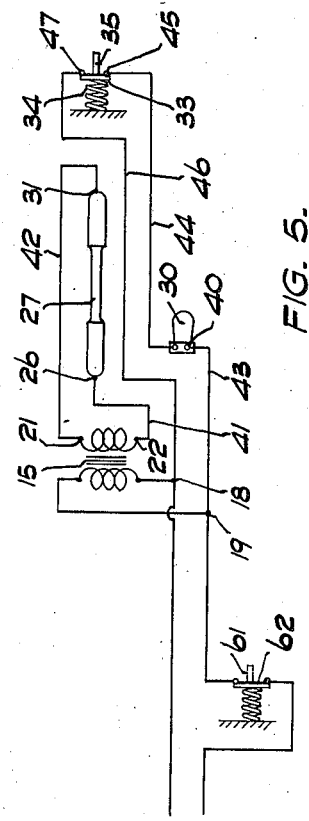
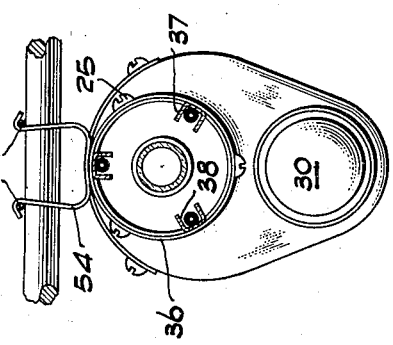
INVENTOR
MILTON KALISCHER
BY
ATTORNEY Sept. 17, 1940.  M. KALISCHER  2,215,123
FOOD PRESERVING APPARATUS
Filed Nov. 5, 1938  3 Sheets—Sheet 3
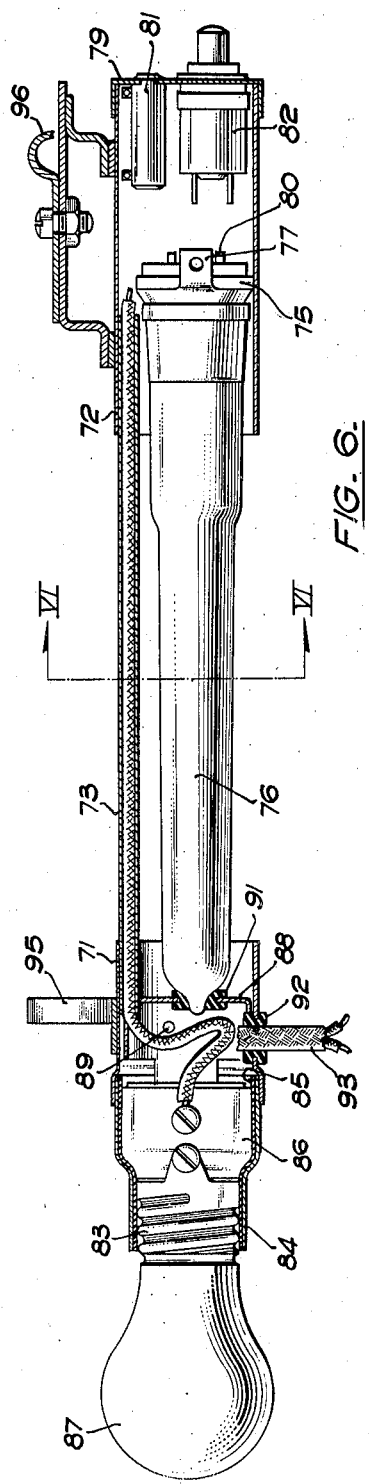
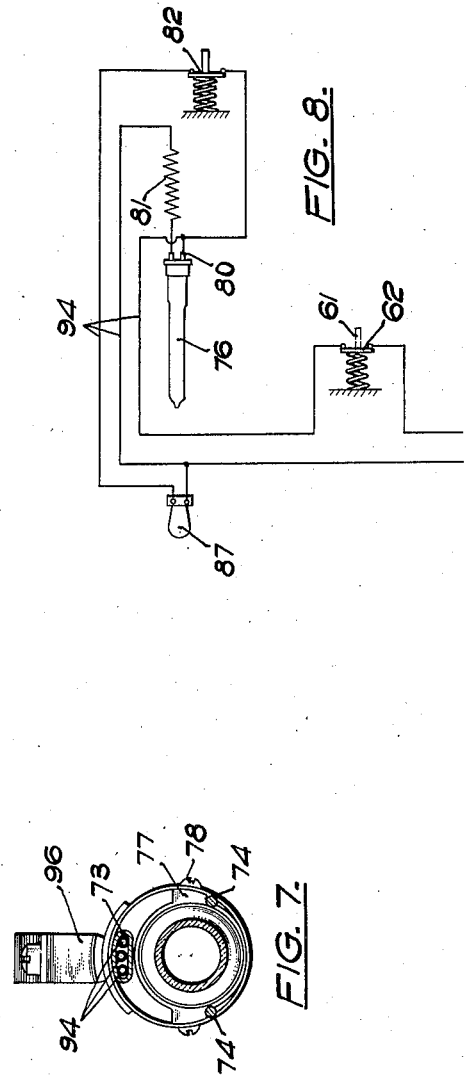
INVENTOR
MILTON KALISCHER
BY
ATTORNEY Patented Sept. 17, 1940

2,215,123

UNITED STATES PATENT OFFICE 2,215,123

FOOD PRESERVING APPARATUS

Milton Kalischer, Longmeadow, Mass., assignor to Westinghouse Electric & Manufacturing Company, East Pittsburgh, Pa., a corporation of Pennsylvania Application November 5, 1938, Serial No. 238,979

6 Claims. (Cl. 62—1)

This invention relates to food preserving apparatus and more particularly to a means for and a method of installing a sterilizing lamp in a refrigerator.

It is an object of this invention to provide a unit mounting for a sterilizing lamp which is readily installed in a refrigerator, and a method for supplying power for the sterilizing lamp from a power source in the interior of the cabinet.

Another object is to provide a unit mounting for a sterilizing lamp and an illuminating lamp which replaces the usual illuminating lamp in a domestic refrigerator and secures power through the circuit of the replaced illuminating lamp.

It is a further object of my invention to provide a sterilizing lamp adapter which may be installed in any refrigerator having an existing source of power in the interior of the cabinet.

These and other objects are effected by my invention as will be apparent from the following description and claims taken in connection with the accompanying drawings, forming a part of this application, in which:

Fig. 3 is a vertical section through the unit;

Fig. 4 is a section through the unit on the line III—III of Fig. 3 looking in the direction of the arrows;

Fig. 5 is a diagrammatic representation of the wiring of the unit illustrated in Figs. 1, 2, 3, and 4;

Fig. 6 is a vertical section of a modification of the unit of this invention;

Fig. 7 is a section through the unit on the line VI—VI of Fig. 6 looking in the direction of the arrows; and, Fig. 8 is a diagrammatic representation of the wiring of the unit illustrated in Figs. 6 and 7.

Figure 1:
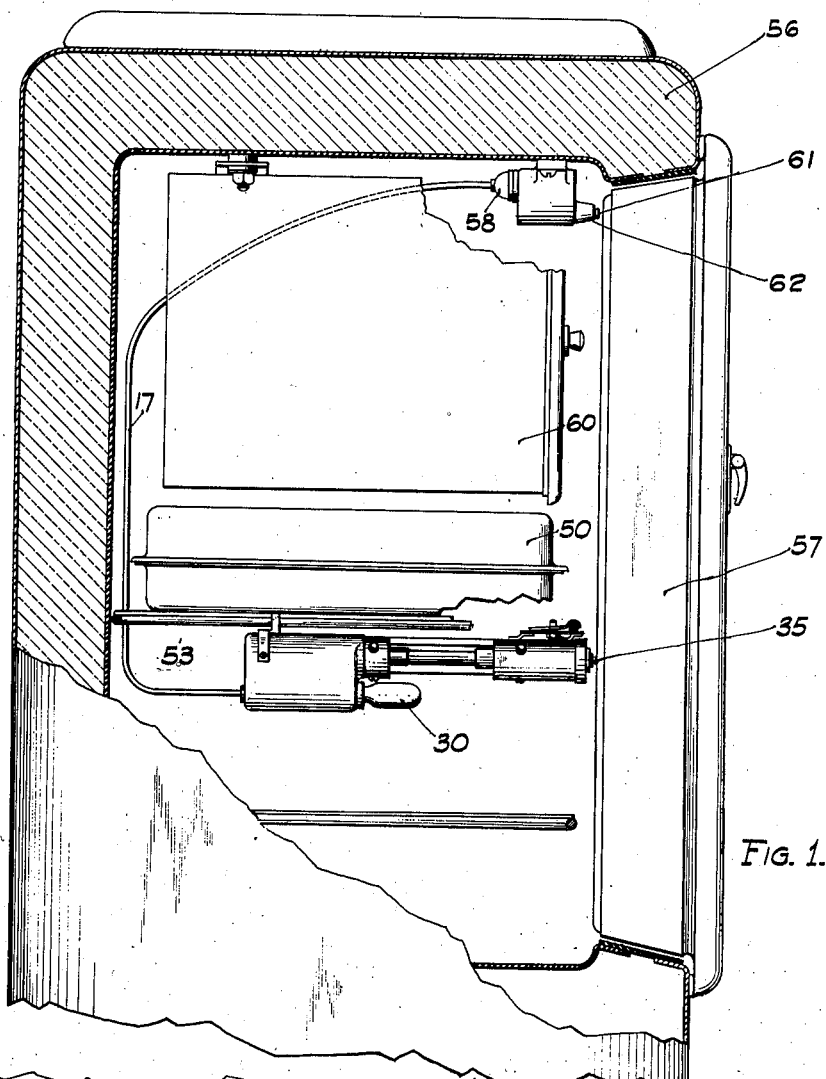
Fig. 1 is a side elevation of a domestic refrigerator with parts broken away to show the unit containing the sterilizing and illuminating lamp of this invention.

Referring now to the embodiment of the invention shown in Figs. 1, 2, 3, 4, and 5 a casing for the unit comprises a tube 11, a cap 12 at the end of the tube 11, a transformer casing 13, and an adapter 14 connecting the transformer casing 13 and the tube 11. The transformer casing 13 is generally cup-shaped and houses a transformer 15. A bushed opening 16 in the wall of the casing provides for the passage of lead-in wires 17 connected to the primary terminals 18 and 19 of the transformer. The terminals of the secondary winding of the transformer are represented by 21 and 22.

The adapter 14 forms a continuation of the transformer casing 13 and is detachably joined thereto by an inner sleeve 23 secured to the adapter 14 and engaging the transformer casing 13 by registering detents 24 pressed into the transformer casing 13 and the sleeve 23. A socket 20 for an illuminating lamp 30 is secured in and projects through the wall of the adapter 14. The socket 20 is provided with terminals 40.

The end of the adapter 14 is reduced in size to telescope over one end of the tube 11 and is secured to the tube 11 by three screws 25. The three screws 25 also engage the flange of a socket 26 for a sterilizing lamp 27 and secure the socket 26 in place. The socket 26 is generally cup-shaped and is made of insulating material. A metal spring 28 is secured in the hollow of the socket 26 and one end of the spring 28 projects through the base of the socket 26 and through a metal washer 29 to which the projecting end of the spring 28 is brazed. The projecting end of the spring 28 forms a terminal of the socket 26 to which a lead wire may be soldered. A similar socket 31 is secured within and near the other end of the tube 11 and the two sockets are spaced to clamp two electrode terminals 32 of a sterilizing lamp 27.

A switch 33 is secured in the cap 12 of the tube. This switch 33 is shown schematically in Fig. 5 and is of the general type used in domestic refrigerators for controlling an interior illuminating light therein. It is biased in the closed position by a spring 34 and is opened by a pressure on a push rod 35.

The sterilizing lamp 27 in the adapter is of the type described in the patent application of R. F. James, Serial No. 734,620 filed July 11, 1934 and assigned to Westinghouse Electric & Manufacturing Company. It is inserted in the unit by removing the transformer casing 13 from the adapter 14, unscrewing the screws 25 and removing the socket 26 from the tube 11. The sterilizing lamp 27 may then be slid through the tube 11 into the other socket 31 and the first-named socket 26 and the transformer casing 13 replaced in their normal position.

Three longitudinal panels are cut from approximately the center portion of the tube to provide openings 36 through which the sterilizing rays of the lamp 27 radiate. The longitudinal edges 37 of panels between the openings 36 of the tube 11 are bent inwardly to provide channels 38 between the openings 36 in which channels the wires connecting the various apparatus in the unit are placed. This construction is most clearly shown in Fig. 4. Holes 39 for the lead wires are also provided in the sockets 26 and 31 in line with the channels 38.

The interior wiring of the unit is best shown in Fig. 5 in which the various elements are approximately at their normal positions. The secondary terminal 22 of the transformer is connected to the terminal of the socket 26 by a lead 41 and the other secondary terminal 21 to the terminal of the socket 31 by a lead 42 passing through the upper hole 39 in the sockets 26 and 31 and through the upper channel 38 in the tube 11. A lead 43 from the primary terminals 19 of the transformer 15 is connected to one of the terminals 40 of the illuminating lamp socket 20; another lead 44 is connected to the other terminal 40 of the illuminating lamp socket 20 and passes through one pair of the lower holes 39 in the sockets 26 and 31 and through the adjacent channel 38 of the tube 11 to one terminal 45 of the switch 33. Another lead 46 is connected to the other terminal 47 of the switch 33 and passes through the remaining lower pair of holes 39 in the sockets 26 and 31, through the remaining channel 38 in the tube 11 and to the remaining terminal 18 of the transformer 15. It will be observed that the illuminating lamp 30 and its switch 33 are connected in parallel with the transformer 15. The leads 41, 42, 43 and 46 should be of sufficient length to permit adequate separation of the transformer casing 13 and the adapter 14 for the removal and insertion of the sterilizing lamp 27.

Figure 2:
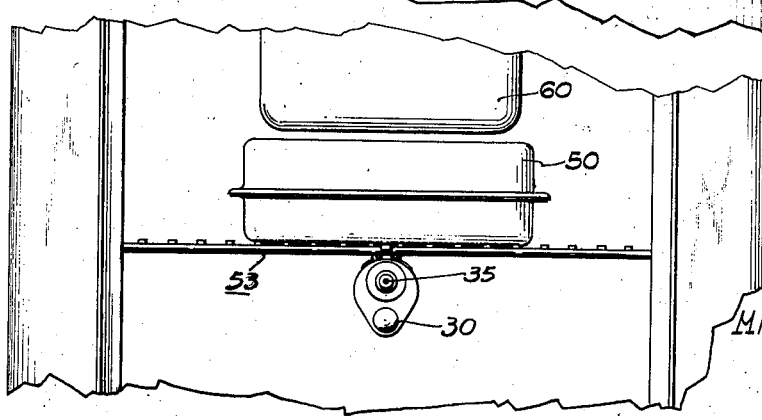
Fig. 2 is a front elevation of the refrigerator of Fig. 1 with parts broken away and the door removed to show the sterilizing and illuminating lamp.

The unit is preferably installed in the center of the refrigerated chamber so that the radiations of the sterilizing lamp reach all parts of the chamber. As shown in Figs. 1 and 2, it is attached to the underside of the shelf 53 which supports a meat keeper 50 which in turn is located immediately below an evaporator 60 of a refrigerator 56.

The unit is provided with a clamp 51 on the upper surface of the tube 11 for grasping the front bar 52 of the wire shelf 53. A clip 54 is also provided on the upper surface of the transformer casing 13 which clip is hooked to two adjacent wires 55 of the shelf 53. The unit is installed below a shelf 53 in a refrigerator 56 so that the door 57 of the refrigerator 56, when closed, engages the push rod 35 of the switch 33 and extinguishes the illuminating lamp 30. Such an installation is shown in Figs. 1 and 2. The conductors 17 are preferably connected to a plug 58 which is inserted in a socket in the refrigerated chamber, which socket, in turn, is connected to a source of power.

If the refrigerator is provided with a door-controlled illuminating lamp, the socket of this lamp may be utilized as a source of continuous power by blocking the door-controlled switch 62 in the permanently closed position. This may be done by removing or cutting off the push rod 61 controlling the switch 62 or by short-circuiting the switch. Fig. 1 shows an installation in which the push rod 61 of the regular door-controlled switch 62 has been cut off.

Referring now to Figs. 6, 7, and 8, the casing of the sterilizing and illuminating lamp comprises two spaced sections of tubing 71 and 27 secured together by the flattened tube 73 and by two rods 74 which tube and rods are brazed at each of their respective ends to the interior surface of one of the tube sections 71 and 72. A socket 75 for a sterilizing lamp 76 is secured by the lugs 77 and the screws 78 in the tube section 72 and the end of the tube section 72 is closed by a cap 79. A ballast resistance 81 for the sterilizing lamp 76 is secured in the cap 79 and also secured therein is a switch 82 of the same general type as the switch 33 shown in Fig. 5.

The tube section 71 is provided with a standard lamp receptacle 83 comprising a shell 84 lined with electrical insulating material 85 and a socket 86 for an illuminating lamp 87. The shell 84 is secured to the tube section 71 by the usual pressed-in detents not shown in the drawings. The socket 86 is secured in the shell 84 by a cup-shaped retainer 88 held in place by three screws 89, the threaded portion of one of which is shown projecting through the retainer 88 in Fig. 6. A bushed opening 91 in the side of the retainer 88 engages the tip of the sterilizing lamp 76. A bushed opening 92 is also provided in the tube section 71 for the passage of the power supplying conductors 93.

The sterilizing lamp 76 is provided with prong-type connectors 80, such as used on radio tubes, which prongs slip into clips (not shown) in the socket 75. The sterilizing lamp 76 may be inserted or removed by removing from the casing the lamp receptacle 83 and the retainer 88 from the shell section 71. The sterilizing lamp 76 may then be inserted or removed from its socket 75.

The wiring diagram of the lamp is shown in Fig. 8 wherein the elements of the unit are located in approximately their proper relative positions. The three leads 94 running through the space between the two tube sections 71 and 72 are carried through the flattened tube 73, as shown in Fig. 7. The leads in the tube section 71 must be sufficiently long and flexible to afford adequate separation of the receptacle 83 and the shell 71 for the insertion or removal of the sterilizing lamp 76. A detailed description of the wiring is not deemed necessary but it will be observed that, as shown in the first modification, the sterilizing lamp 76 and its ballast resistance 81 are in parallel with the illuminating lamp 87 and its lamp switch 82.

The unit is provided with a mounting clip 95 and a mounting clamp 96 similar to the clip 54 and the clamp 51 in the modifications shown in Figs. 1, 2, 3, and 4 and the unit is mounted and used in the same manner as the before-described modification.

It will be apparent from the above description that this invention provides a unit for a sterilizing lamp and an illuminating lamp which is adapted for mounting in a refrigerator. The invention also provides a method for securing power for the unit from the ordinary illuminating lamp socket of the refrigerator.

While I have shown my invention in several forms, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

What I claim is:

1. In a unit mounting for a sterilizing lamp and an illuminating lamp in a refrigerator cabinet equipped with a door, the combination of a casing, a socket therein for an illuminating lamp, a switch in said casing biased to the closed position, said switch having an actuating member to open the same, a second socket in said casing for a sterilizing lamp, a connection comprising two electrical conductors adapted to be connected to a current supply exterior of said casing, a lead connecting said conductors and including said switch and said socket for the illuminating lamp in series, a second lead in parallel with said first-named lead for supplying current to the socket for the sterilizing lamp, said casing being adapted for mounting in a refrigerator with said switch-actuating member in operative relationship with the door of the refrigerator so that the switch will be opened when the door is closed.

2. In a unit mounting for a sterilizing lamp and an illuminating lamp in a refrigerated chamber equipped with a door, the combination of a casing, a socket therein for an illuminating lamp, a switch in said casing biased to the closed position, said switch having an actuating member to open the same, a second socket in said casing for a sterilizing lamp, a voltage adapting device in said casing and associated with said socket for the sterilizing lamp, and a connection comprising two electrical conductors adapted to be connected to a current supply exterior of said casing, a lead connecting said conductors and including said switch and said socket for the illuminating lamp in series, a second lead, in parallel with said first-named lead, for supplying power to said voltage adapting device, said casing being adapted for mounting in a refrigerator with said switch actuating member in operative relationship with the door of the refrigerator so that the switch is opened when the door is closed.

3. In a unit mounting for a sterilizing lamp and an illuminating lamp in a refrigerator cabinet equipped with a door, the combination of a casing, a socket therein for an illuminating lamp, a switch in said casing biased to the closed position, said switch having an actuating member to open the same, a second socket in said casing for a sterilizing lamp, a transformer in said casing, said transformer having primary and secondary windings, a connection comprising two electrical conductors adapted to be connected to a current supply exterior of said casing, a lead connecting said conductors and including said switch and said socket for the illuminating lamp in series, a second lead connecting said conductors and including the primary circuit of said transformer, and a connection between the secondary winding of said transformer and said sterilizing lamp, said casing being adapted for mounting in a refrigerator with said switch actuating member in operative relation with the door of the refrigerator.

4. In a unit mounting for a sterilizing lamp and an illuminating lamp in a refrigerator cabinet equipped with a door, the combination of a casing, a socket therein for an illuminating lamp, a switch in said casing biased to the closed position, said switch having an actuating member to open the same, a second socket in said casing for a sterilizing lamp, an electrical ballast in said casing, a connection comprising two electrical conductors adapted to be connected to a current supply exterior of said casing, a lead connecting said conductors and including said switch and said socket for the illuminating lamp in series, a second lead connecting said conductors and including said electrical ballast and said sterilizing lamp in series, said casing being adapted for mounting in a refrigerator with said switch actuating member in operative relation with the door of the refrigerator so that the switch will be opened when the door is closed.

5. In a sterilizing and lighting unit adapted for installation in a refrigerator cabinet having a door, the combination of a casing, a socket adapted to receive a sterilizing lamp, a second socket adapted to receive an illuminating lamp, a switch, an actuating device therefor, conductors for supplying electric power to said unit, and electrical connections for conducting the electric power from said conductors to each of said sockets, said switch controlling the power received by said second socket, said unit being so adapted for mounting in a refrigerator that the door thereof motivates the switch actuating device to conduct power from said conductors to said second socket when said door is open and interrupt the power to said second socket when the door is closed.

6. In a unit mounting for a sterilizing lamp and an illuminating lamp in a refrigerator cabinet equipped with a door, the combination of a casing, a socket therein for an illuminating lamp, a second socket in said casing for a sterilizing lamp, two electric conductors associated with said unit and adapted for supplying electric current to both of said sockets in parallel, means for mounting the unit in said refrigerator cabinet, and means associated with said unit and engageable by said door for interrupting the current to said illuminating lamp socket when the door is closed without interrupting the current to the sterilizing lamp socket.

MILTON KALISCHER.